(12) United States Patent
Hiramoto

(10) Patent No.: US 7,905,592 B2
(45) Date of Patent: Mar. 15, 2011

(54) RIMLESS EYEGLASSES

(75) Inventor: Kiyoshi Hiramoto, Hiroshima (JP)

(73) Assignee: 21 (Two-One) Co., Ltd., Hiroshima-shi (JP)

( * ) Notice: Subject to any disclaimer, the term of this patent is extended or adjusted under 35 U.S.C. 154(b) by 0 days.

(21) Appl. No.: 12/667,582

(22) PCT Filed: Jun. 9, 2008

(86) PCT No.: PCT/JP2008/060526
§ 371 (c)(1),
(2), (4) Date: Feb. 2, 2010

(87) PCT Pub. No.: WO2009/004895
PCT Pub. Date: Jan. 8, 2009

(65) Prior Publication Data
US 2010/0165285 A1  Jul. 1, 2010

(30) Foreign Application Priority Data

Jul. 4, 2007 (JP) ................. 2007-176447
Apr. 16, 2008 (JP) ................. 2008-106583

(51) Int. Cl.
*G02C 1/02* (2006.01)
(52) U.S. Cl. ....................... 351/110; 351/144
(58) Field of Classification Search ............ 351/41, 351/110, 140, 144
See application file for complete search history.

(56) References Cited

U.S. PATENT DOCUMENTS

| 5,585,870 A | 12/1996 | Masunaga |
| 5,835,183 A | 11/1998 | Murai et al. |
| 6,767,096 B2 | 7/2004 | Hiramoto |
| 7,717,553 B2 * | 5/2010 | Lever ............ 351/110 |
| 2005/0275793 A1 | 12/2005 | Yamaguchi et al. |
| 2006/0077337 A1 | 4/2006 | Sakai |
| 2007/0216856 A1 * | 9/2007 | Grove ............ 351/110 |

FOREIGN PATENT DOCUMENTS

| JP | 3005441 | 10/1994 |
| JP | 3007846 | 12/1994 |
| JP | 10-62721 | 3/1998 |
| JP | 11-64799 | 3/1999 |
| JP | 2002-318372 | 10/2002 |
| JP | 2004-53689 | 2/2004 |
| JP | 2005-31418 | 2/2005 |
| WO | WO 2004/107021 A1 | 12/2004 |

* cited by examiner

*Primary Examiner* — Huy K Mai
(74) *Attorney, Agent, or Firm* — Venable LLP; Michael A. Sartori; Justine A. Gozzi

(57) ABSTRACT

Rimless eyeglasses are provided, which do not produce loosening in a connecting area between an eyeglass lens and a lens fixing portion, and which also allows for the easy attachment or removal of a lens. The rimless eyeglasses include eyeglass lenses and as eyeglass components, a metallic end-piece member and a metallic bridge member, having a lens fixing portion fixedly attached to the eyeglass lens and a connecting portion connected to a temple or a bridge. The lens fixing portions of the metallic end-piece member and the metallic bridge member have cylindrical leg portions, each inserted into a lens hole formed in the eyeglass lens. Spiral-shaped grooves are formed in the outer peripheral faces of the leg portions. An adhesive is injected into the spiral-shaped grooves.

6 Claims, 10 Drawing Sheets

RIMLESS EYEGLASSES

TECHNICAL FIELD

This invention relates to rimless eyeglasses having no rim, for holding the outer periphery of a lens.

BACKGROUND ART

Conventionally, such rimless glasses are known, for example as described in Patent Literature 1.

Patent Literature 1 discloses rimless eyeglasses which comprise a lens fixing member which is fixedly attached to an eyeglass lens and a connecting member which is connected to a temple or to a bridge, to which the lens fixing member and the connecting member are detachably connected. The eyeglass lens and the lens fixing member are fixed in such a form that the cylinder-shaped leg portion of the lens fixing member, which is formed of a resin, is inserted into a lens hole formed in the lens.

Also, Patent Literature 2 describes rimless eyeglasses which are designed such that a pair of right and left lenses are coupled and held by use of a metallic bridge, which has edge contact portions in parallel-line form capable of making linear contact with the inner edges of the lenses and inner piercing portions capable of passing through bridge locking holes respectively formed in portions of the lenses in the vicinity of the lens inner edges, and also by use of metallic end-pieces each of which has an edge contact portion in parallel-line form capable of making line contact with the outer edge of the lens and an outer piercing portion capable of passing through an end-piece locking hole formed in a portion of the lens in the vicinity of the lens outer edge.

In general, the gap between each of such lens holes and the member inserted therethrough is then filled with an adhesive.

However, such conventional eyeglasses undergo the problem of looseness produced between the eyeglass lens and the lens fixing member, for example, when the eyeglasses are continuously used for a long time, since the cylinder-shaped leg portion of the lens fixing member is simply inserted into a lens hole formed in the eyeglass lens in order to fix it to the eyeglass lens.

It is also conceivable to use an adhesive together to prevent the occurrence of such loosening. In this case, however, although the problem associated with the loosening is remedied, there is another problem of making maintenance operations such as lens replacement difficult. In particular, when both the eyeglass lens and the lens fixing portion are formed of plastic, since the bonded portion is not easily separated, the only way to separate them is to break the eyeglass lens itself or the lens fixing portion itself, which is a significant problem.

It is an object of the present invention to solve such conventional problems and provide rimless eyeglasses in which loosening does not occur in the connecting area between an eyeglass lens and a lens fixing portion, and which also allows for the easy attachment or removal of a lens.

Patent Literature 1: Japanese Patent Laid-Open No. 2004-53689

Patent Literature 2: Japanese Registered Utility Model No. 3007846

SUMMARY

Rimless eyeglasses according to an aspect of the present invention attaining the above object comprise eyeglass lenses, an eyeglass component having a lens fixing portion fixedly attached to the eyeglass lens, and a connecting portion connected to either a temple or a bridge. The lens fixing portion of the eyeglass component has a cylindrical leg portion inserted into a lens hole formed in the eyeglass lens, and a spiral-shaped groove is formed in the outer peripheral face of the leg portion.

With this structure, the cylindrical leg portion of the lens fixing portion of the eyeglass component is inserted into the lens hole formed in the eyeglass lens, whereby the lens fixing portion of the eyeglass component is fixedly attached to the eyeglass lens. At this stage, since the spiral-shaped groove is formed in the outer peripheral face of the leg portion, the inner peripheral face of the lens hole and the outer peripheral face of the leg portion come into approximately uniform contact with each other. As a result, loosening does not occur in the connecting area, and also the eyeglass component and the lens are easily attached or removed.

The spiral-shaped groove may be a single strip or a plurality of strips.

In the case of a plurality of strips, the strips may be wound in directions different from each other.

Further, preferably, the lens fixing portion is adhesively bonded to the eyeglass lens by injecting an adhesive into the spiral groove.

With this structure, since an adhesive can reliably fill the spiral-shaped groove, the adhesive runs evenly through the entire region of the connecting area between the inner peripheral face of the lens hole and the outer peripheral face of the leg portion, thus a reliable fixed attachment can be achieved. Accordingly, the leg portion is prevented from slipping out of the lens hole, and also backlash and play between them are not produced at all.

Preferably, also, a flat face having a width greater than the width of the groove is formed on the area between the turns of the spiral-shaped groove.

With this structure, since the contact between the inner peripheral face of the lens hole and the outer peripheral face of the leg portion is made on the flat face having a greater width, facial pressure on the eyeglass lens is reduced, making the occurrence of a fracture difficult. In addition, the adhesive also acts as a shock absorber, making it possible to further inhibit such occurrence of a fracture.

Further, preferably, the eyeglass lenses are made of plastic and the lens fixing portion is made of metal.

With this structure, because adhesives generally produce a weaker adhesive force between materials of different natures than that between materials of the same nature, the bond caused by the adhesive is easily broken without damage to the eyeglass lens by rotating the eyeglass lens and the lens fixing member relative to each other.

Further, the eyeglass component may be an end-piece of which the connecting portion is connected to the temple through a hinge, or alternatively be a bridge including the lens fixing portion and the connecting portion, and formed of a single wire rod.

BRIEF DESCRIPTION OF THE DRAWINGS

FIGS. 1A-C show rimless eyeglasses according to a first embodiment of the present invention, in which:

FIG. 1A is a front view, FIG. 1B is a top plan view and FIG. 1C is a side view;

FIGS. 2A-C show a metallic end-piece member which is an eyeglass component of the rimless eyeglasses according to the first embodiment of the present invention, in which in which FIG. 2A is a front view, FIG. 2B is a top plan view and FIG. 2C is a side view;

FIGS. 3A-C show a metallic bridge member which is an eyeglass component of the rimless eyeglasses according to the first embodiment of the present invention, in which in which FIG. 3A is a front view, FIG. 3B is a top plan view and FIG. 3C is a side view;

FIGS. 4A-B illustrate enlarged side views each showing a leg portion of the metallic end-piece member and a leg portion of the metallic bridge member which are eyeglass components of the rimless eyeglasses according to the first embodiment of the present invention, in which FIG. 4A shows the case of forming a spiral-shaped groove in the form of a single strip, in a leg and FIG. 4B shows the case of forming a spiral-shaped groove in the form of a plurality of strips, in a leg;

FIGS. 5A-B illustrate side views each showing how to attach the metallic end-piece member which is an eyeglass component of the rimless eyeglasses to an eyeglass lens according to the first embodiment of the present invention, in which FIG. 5A shows a state before coupling and FIG. 5B shows a state after coupling;

FIGS. 9A-C show rimless eyeglasses according to a second embodiment of the present invention, in which FIG. 9A is a front view, FIG. 9B is a top plan view and FIG. 9C is a side view; and FIGS. 10A-C show a metallic end-piece member which is an eyeglass component of the rimless eyeglasses according to the second embodiment of the present invention, in which in which FIG. 10A is a front view, FIG. 10B is a top plan view and FIG. 10C is a side view.

EXPLANATION OF REFERENCES 100U, 100S RIMLESS EYEGLASSES
110U, 110S EYEGLASS LENS
112U, 112S LENS HOLE
120U, 120S METALLIC END-PIECE MEMBER
122U, 122S LEG PORTION
124U, 124S ARM PORTION
128 SPIRAL-SHAPED GROOVE
129 FLAT FACE
130 METALLIC BRIDGE MEMBER
132 LEG PORTION
134 ARM PORTION
138 SPIRAL-SHAPED GROOVE
139 FLAT FACE
160 HINGE
170 TEMPLE

DETAILED DESCRIPTION

Embodiments of the present invention will be described below with reference to the accompanying drawings. It should be noted that as used herein, terms used to express directions such as "back and forth", "right and left" and "upper and lower" express directions as when the eyeglasses are worn on a person in the usual way.

Figure 1A:
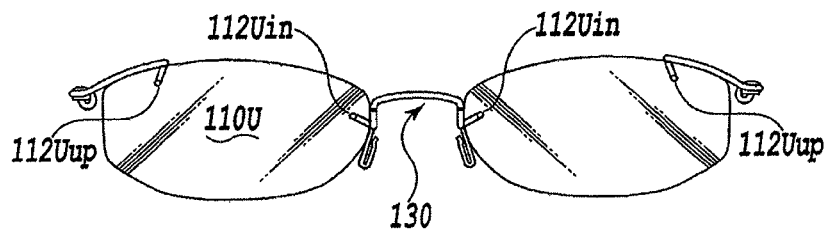
Figure 1B:
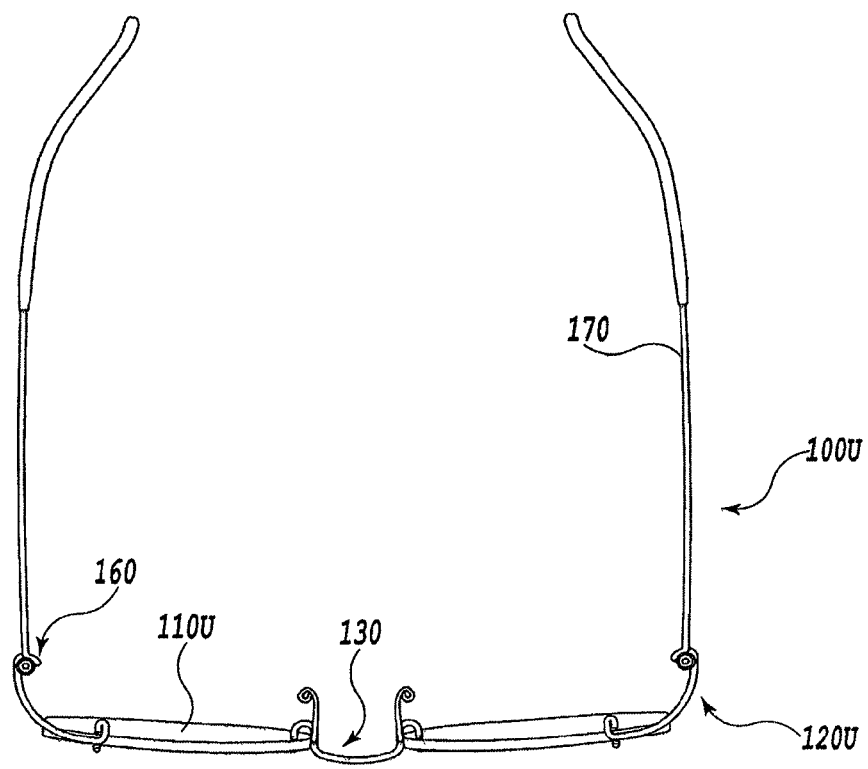
Figure 1C:
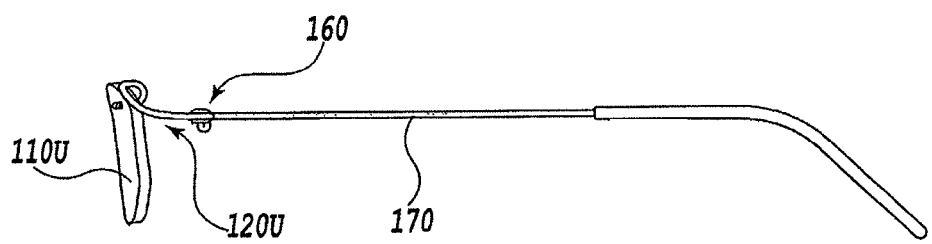

In FIGS. 1A-1C, rimless eyeglasses 100U according to a first embodiment of the present invention comprise right and left plastic-made lenses 110U, right and left metallic end-piece members 120U, a metallic bridge member 130, the end-piece members 120U, and the bridge member 130 being eyeglass components fixedly attached to the lenses 110U. It should be noted that, in the first embodiment, as clearly seen from FIGS. 1A to 1C, each of the lenses 110U has a bridge-side lens hole 112Uin and an end-piece-side lens hole 112Uup respectively perforated at positions close to the inner edge and the upper edge thereof at different vertical levels. In this connection, when a lens hole is referred to without the need to make a distinction between the bridge-side lens hole and the end-piece-side lens hole, the term "112U" is used in the first embodiment.

Figure 2A:
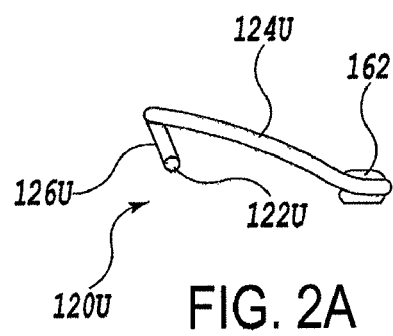
Figure 2B:
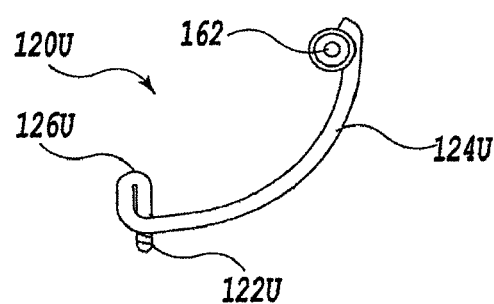
Figure 2C:
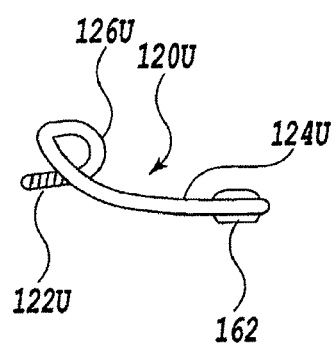

As shown in detail in FIGS. 2A-2C, each of the metallic end-piece members 120U has a leg portion 122U serving as a lens fixing portion which is to be fixedly attached in the lens, and an arm portion 124U serving as a connecting portion, which is connected to a temple. Then, in the present embodiment, a U-shaped curved portion 126U is interposed between the leg portion 122U and the arm portion 124U of the metallic end-piece member 120U, one end of which is formed in a continuous straight line to the leg portion 122U and the other end of which is contiguous to the arm portion 124U via an approximately right-angled portion. In addition, the arm portion 124U is designed in a shape gently curved from the right-angled portion in a downward and backward direction, allowing the portion thereof close to the U-shaped curved portion 126U to make contact with the upper edge portion of the lens 110U. In the present embodiment, the metallic end-piece member 120U includes the leg portion 122U, the arm portion 124U and the U-shaped curved portion 126U, which is formed of one metal wire rod of, for example, a flexible material having easy-bending properties such as a nickel-chromium alloy, a nickel-titanium alloy or the like. Then, a spiral-shaped groove in the form of a single strip 128 is formed in the outer peripheral face of the cylindrical leg portion 122U. As for the spiral-shaped groove 128, as enlarged and shown in FIG. 4A, a flat face 129 having a greater width B than the width A of the groove is formed on the area between the turns of the spiral-shaped groove 128.

In addition, an approximately drum-shaped socket member 162 of a later-described hinge 160 is provided on one end of the arm portion 124U of the metallic end-piece member 120U. Then, the end of the arm portion 124U is coupled to a temple 170 through the hinge 160. It should be noted that the temple 170 may be formed integrally with the arm portion 124U without the hinge 160.

Figure 3A:
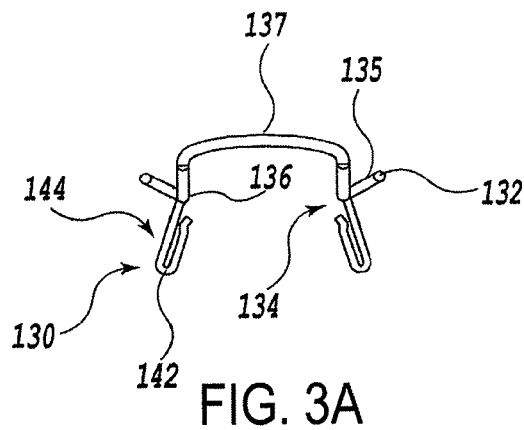
Figure 3B:
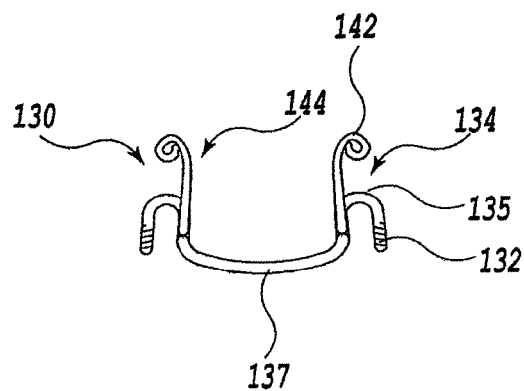
Figure 3C:
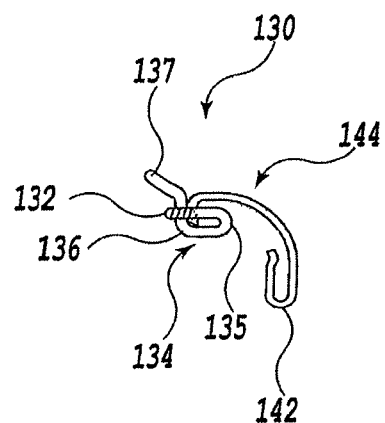

On the other hand, the metallic bridge member 130 has leg portions 132, which are lens fixing portions fixedly attached to the lenses, and arm portions 134 serving as connecting portions connected to the bridge, as shown in detail in FIGS. 3A-3C. It should be noted that the leg portions 132 and the arm portions 134 connected to a later-described connecting portion 137 have paired relationships, and that reference numerals are attached to only one of the paired leg portions 132 and only one of the paired arm portions 134 in FIG. 3A and FIG. 3B for the sake of simplification of the drawings.

In the present embodiment, the arm portion 134 of the metallic bridge member 130 has a U-shaped curved portion 135 and a right-angled bent portion 136 contiguous to the curved portion 135, in which the leg portion 132 is formed in a continuous straight line as one of the extensions of the U-shaped curved portion 135. The ends of the respective right-angled bent portions 136 of the arm portions 134 are connected to the connecting portion 137 serving as the bridge. The metallic bridge member 130 includes the leg portions 132, the arm portions 134 and the connecting portion 137, which is similarly formed as a one-piece bridge of one metal wire rod of, for example, a flexible material having easy-bending properties such as a nickel-chromium alloy, a nickel-titanium alloy or the like. It should be noted that nose-pad attaching members 144, which comprise U-shaped curved portions 142 to which nose pads, not shown, are attached, are respectively joined to both the arm portions 134 of the metallic bridge member 130 which are coupled to each other through the connecting portion 137.

Then, as in the case of the metallic end-piece member 120U, a spiral-shaped groove 138 is formed in the outer peripheral face of the cylindrical leg portion 132. The spiral-shaped groove 138 is identical in form with the spiral-shaped groove 128 in the leg portion 122U of the aforementioned metallic end-piece member 120U. Accordingly, as additionally designated by the reference numerals in FIG. 4A, a flat face 139 having a greater width B than the width A of the groove is formed on the area between the turns of the spiral-shaped groove 138.

Next, the hinge 160 and the temple 170 will be briefly described mainly with reference to FIGS. 1A-1C and FIGS. 5A and 5B. In the present embodiment, the hinge 160 is formed by a combination of the approximately drum-shaped socket member 162 and a J-shaped bent portion 172 formed at the end of the temple 170. More specifically, the socket member 162 has a through-hole perforated at the center, and a groove extending in the circumferential direction at the outer periphery of the socket member 162. In the present embodiment, further, the socket member 162 is formed integrally with the aforementioned metallic end-piece member 120U by way of joining the end of the arm portion 124U of the metallic end-piece member 120U to its outer peripheral portion.

The J-shaped bent portion 172, which is formed at the end of the temple 170 formed of a metal wire rod (for example, a flexible material such as a titanium alloy, a nickel-chromium alloy, a nickel-titanium alloy or the like), comprises a first leg portion inserted through the through hole of the socket member 162 and a second leg portion contiguous to the first leg portion, and is designed such that, when the first leg portion is inserted through the through hole, the socket member 162 is elastically held between the first leg portion and the second leg portion. In addition, the second leg portion is formed such that the second leg portion is bent at an acute angle with respect to the linear shaped portion of the end of the temple 170, and thus the outer peripheral portion of the portion thus bent engages with the groove extending in the circumferential direction in the aforementioned socket member 162.

Figure 5A:
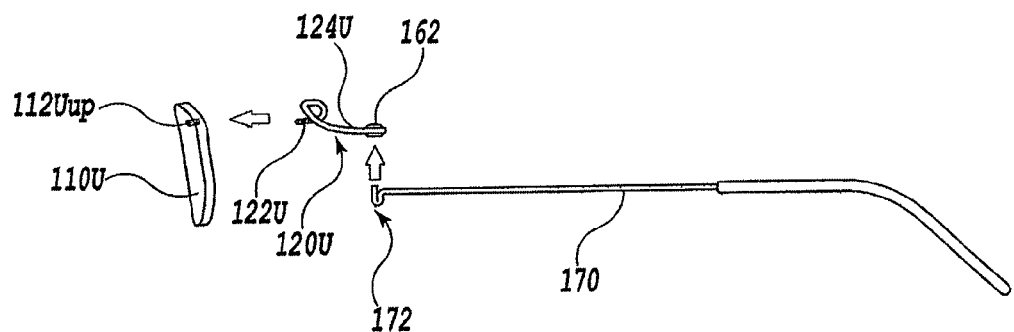
Figure 5B:
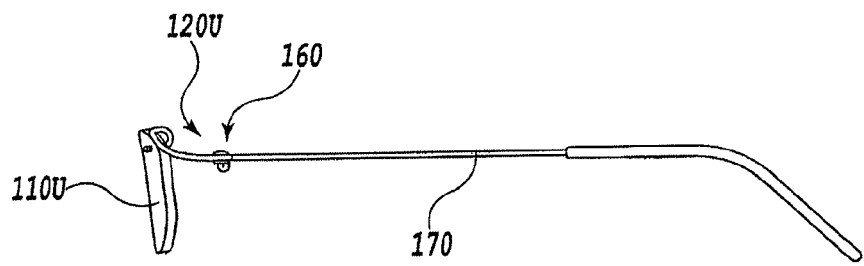

In the first embodiment of the present invention, the rimless eyeglasses 100U are assembled and completed through the following procedure. First, each of the leg portions 132 of the metallic bridge member 130 is inserted from the back side of the lens 110U into the lens hole 112Uin perforated in the bridge-side portion of the lens 110U, and the leg portion 122U of the metallic end-piece member 120U is inserted from the back side of the lens 110U into the lens hole 112Uup perforated in end-piece-side portion of the lens 110U, in order to fixedly attach both the metallic bridge member 130 and the metallic end-piece member 120U to the lens 110U. It should be noted that, FIG. 5A shows by way of example how to insert the metallic end-piece member 120U. At this stage, regarding the metallic bridge member 130, the curvature of the U-shaped curved portion 135 and the perforation position of the bridge-side lens hole 112Uin are determined such that the lens hole 112Uin and the inner edge of the lens 110U are elastically clamped by use of the leg portion 132 which is formed as one of linear extension parts of the U-shaped curved portion 135, and the right-angled bent portion 136 connected to the other part of the U-shaped curved portion 135. On the other hand, regarding the metallic end-piece member 120U, the degree of curve of the arm portion 124U and the perforation position of the end-piece-side lens hole 112Uup are determined such that the lens hole 112Uup and the upper edge of the lens 110U are elastically clamped by use of the leg portion 122U and a part of the arm portion 124U which is in contact with the upper edge of the lens 110U and is close to the U-shaped curved portion 126U (see FIG. 1A).

Figure 4A:
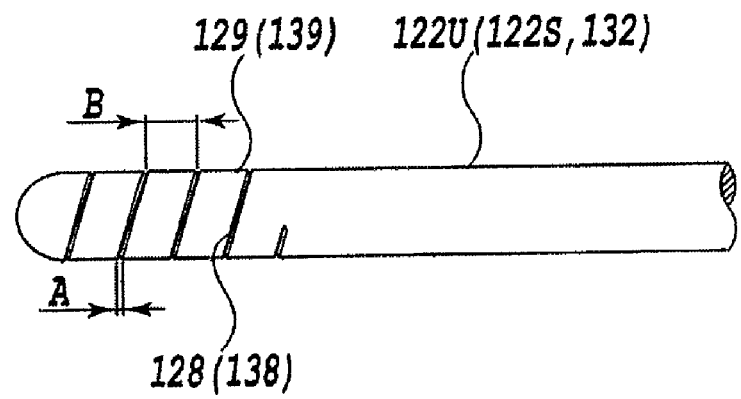

Here, as enlarged and shown in FIG. 4A, the outer peripheral faces of the leg portion 122U of the metallic end-piece member 120U and the leg portion 132 of the metallic bridge member 130, respectively, have a spiral-shaped groove in the form of a single strip, 128 and 138 formed therein, and flat faces 129 and 139 formed on the area between the turns of the spiral-shaped groove, which have a greater width B than the width A of the groove. Because of this, the inner peripheral face of the lens hole 112U and the outer peripheral face of each of the leg portions 122U and 132 come into approximately uniform contact with each other. Accordingly, a fixed attachment among the lens 110U, the metallic end-piece member 120U and the metallic bridge member 130 is reliably established without producing loosening in the connecting areas between them. In addition, since the contact between the inner peripheral face of the lens hole 112U and the outer peripheral face of each of the leg portions 122U and 132 is achieved on the flat face which has a greater width, the facial pressure on the eyeglass lens 110U is reduced, making the occurrence of a fracture difficult.

Figure 6:
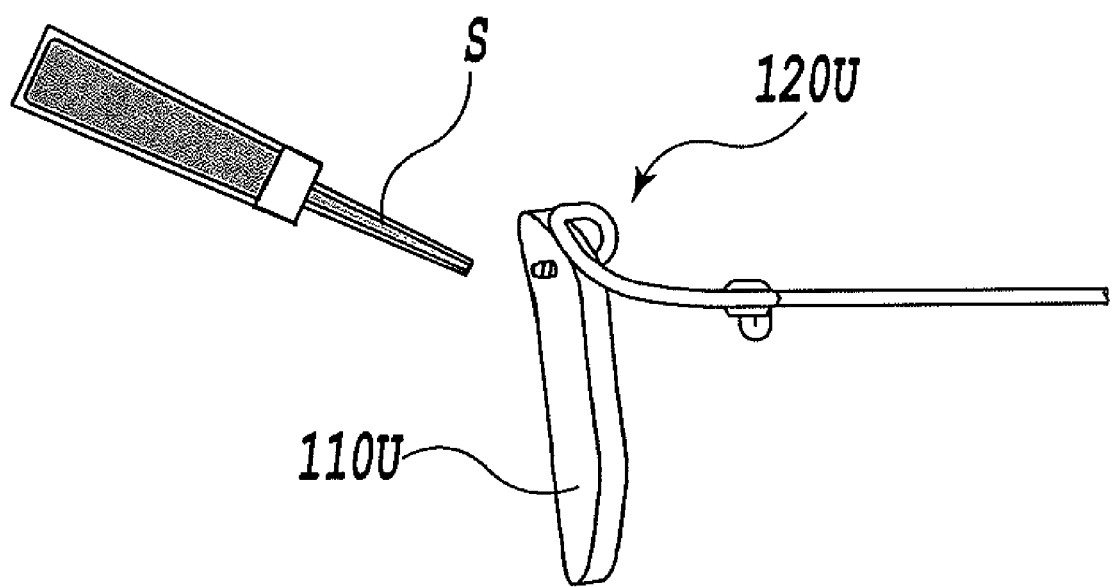
FIG. 6 illustrates a side view showing how to inject an adhesive into a spiral-shaped groove of the rimless eyeglasses according to the first embodiment of the present invention.
Figure 7:
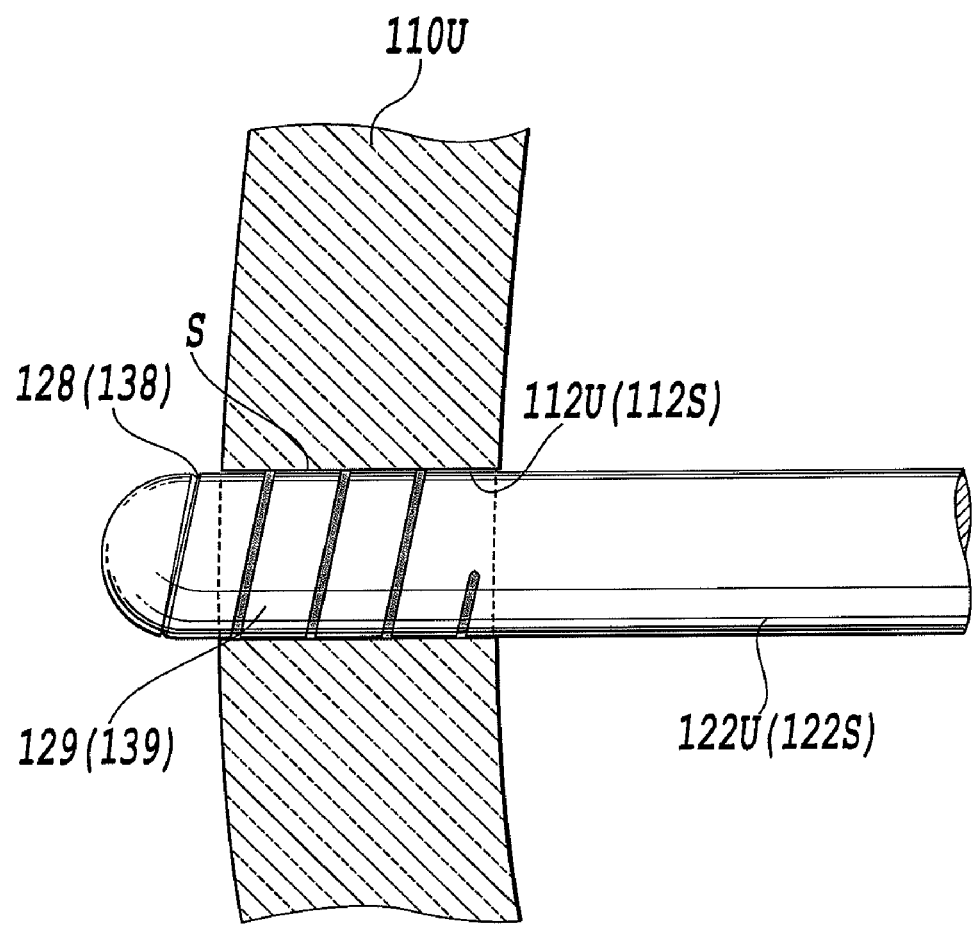
FIG. 7 illustrates a sectional view showing the state when the adhesive fills the spiral-shaped groove of the rimless eyeglasses according to the first embodiment of the present invention.

It should be noted that in order to further ensure such a fixed attachment, as illustrated in FIG. 6, an adhesive may be injected into the spiral-shaped grooves 128 and 138. Specifically, each of the leg portions 122U and 132 is inserted into the lens hole 112U such that its leading end slightly protrudes from the front face of the lens 110U and also such that the head end or the tail end of each of the spiral-shaped grooves 128 and 138 is exposed on the front face of the lens 110U. Therefore, as an adhesive S is injected from the exposed head or tail end of the spiral-shaped grooves 128 and 138, the adhesive S easily flows into the spiral-shaped grooves 128 and 138 as illustrated in FIG. 7. As a result, the adhesive S runs evenly through the spiral-shaped grooves 128 and 138 of the legs 122U and 132, thus a reliable fixed attachment can be achieved. The adhesive S also acts as a shock absorber, which makes it possible to further inhibit the occurrence of a fracture in the aforementioned eyeglass lens 110U.

Then, finally, as illustrated in FIG. 5A, the temple 170 is coupled to the approximately drum-shaped socket member 162 formed integrally with the metallic end-piece member 120U. Specifically, the first leg portion of the J-shaped bent portion 172 formed at the end of the temple 170 is inserted into the through hole of the socket member 162, and similarly the bent portion of the second leg portion is engaged with the groove extending in the circumferential direction, in order to elastically hold the socket member 162 between the first leg portion and the second leg portion. Thus, the rimless eyeglasses 100U are completed by coupling the components to one another without using any screw or the like.

For reference, the order of the steps in the aforementioned assembling procedure may be changed. For example, the metallic end-piece member 120U may be initially attached, then the temple 170 may be coupled, after which the metallic bridge member 130 may be attached.

Figure 8A:
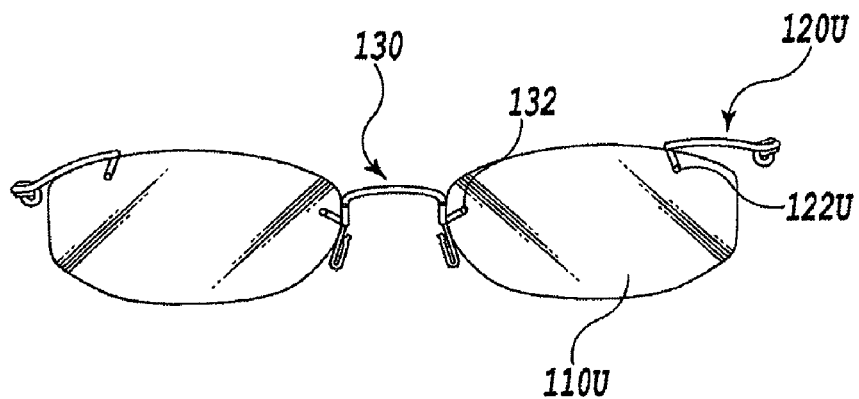
FIGS. 8A-B illustrate front views each showing how to remove the metallic end-piece member from the rimless eyeglasses according to the first embodiment of the present invention.
Figure 8B:
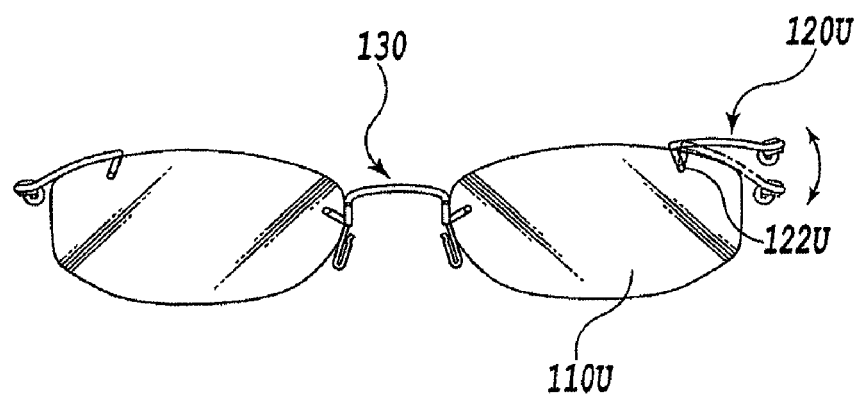

Further, when the lens 110U needs replacing, the replacement can be carried out by the following procedure. Specifically, each of the regions of the metallic end-piece member 120U and the metallic bridge member 130, which are at a predetermined distance from the respective leg portions 122U and 132 are grasped by hand, and then the end-piece member 120U or the bridge member 130 is moved vertically such that a relative rotation of about 20 degrees is produced about the leg portion 122U or 132, as illustrated in FIGS. 8A-8B. In this manner, even when the spiral-shaped groove 128 or 138 is filled with an adhesive, the adhesive filling the spiral-shaped groove is scraped off, so that the metallic end-piece member 120U or the metallic bridge member 130 can be easily removed without need for a special tool or the like. It should be noted that FIGS. 8A-8B illustrate only the case of removing the metallic end-piece member 120U, but it goes without saying that the metallic bridge member 130 can be removed in a similar manner.

Further, in order to reuse the metallic end-piece member 120U and the metallic bridge member 130, which have been removed in the above manner, the adhesive adhering to the spiral-shaped grooves 128 and 138 can be removed simply by means of brushing or the like. The lens 110U can also be used by re-passing a drill through the lens hole 112 for removal of the adhering adhesive.

Next, rimless eyeglasses 100S according to a second embodiment of the present invention will be described. The rimless eyeglasses 100S according to the second embodiment differ from the aforementioned rimless eyeglasses 100U according to the first embodiment only in the shape of the metallic end-piece member which is an eyeglass component thereof, and in the perforation position of the lens hole thus involved. Accordingly, the differences alone will be described below to avoid repetition.

Figure 9A:
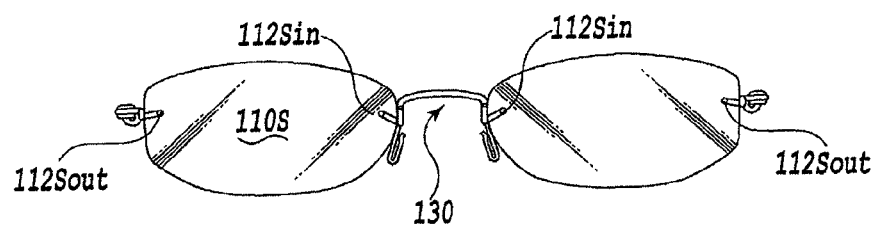
Figure 9B:
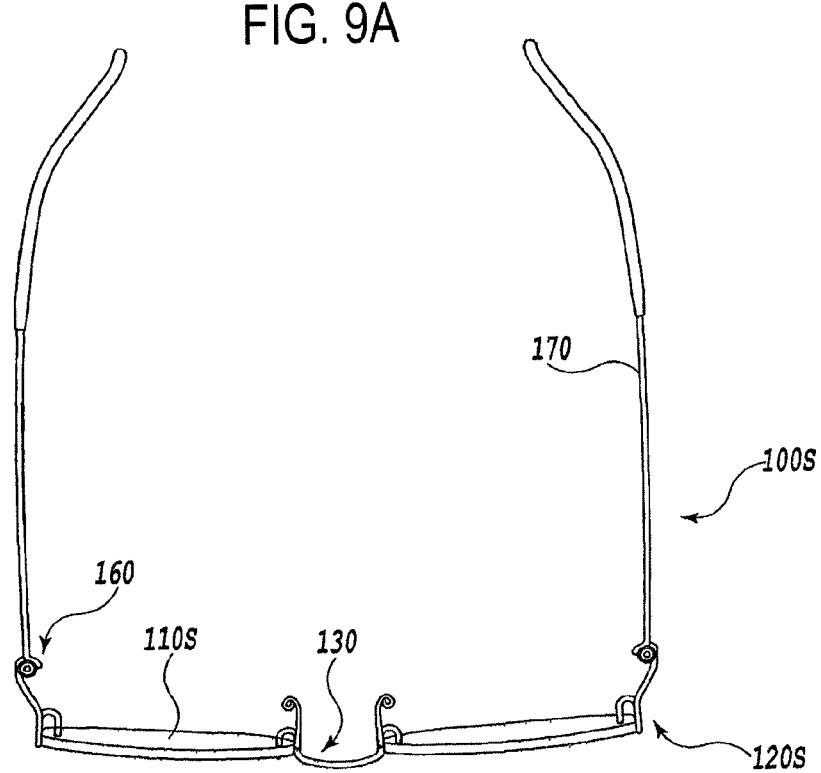
Figure 9C:
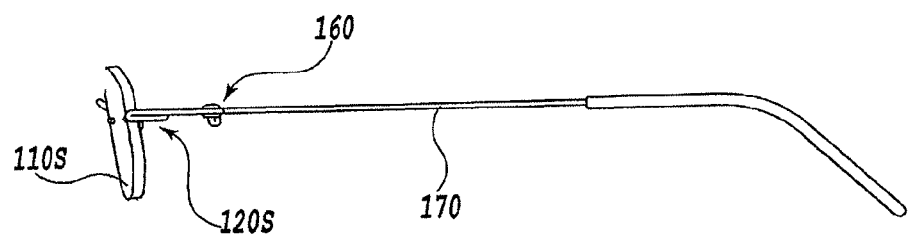

Specifically, in FIGS. 9A-9C, the rimless eyeglasses 100S according to the second embodiment comprise right and left plastic-made lenses 110S, right and left metallic end-piece members 120S and a metallic bridge member 130, the end-piece members 120S and the bridge member 130 being eyeglass components fixedly attached to the lenses 110S. It should be noted that, in the second embodiment, as clearly seen from FIGS. 9A-9C, each of the lenses 110S has a bridge-side lens hole 112Sin and an end-piece-side lens hole 112Sout respectively perforated in positions close to the inner edge and to the outer edge thereof at approximately the same vertical level. In this connection, when the lens hole is referred to without the need to make a distinction between the bridge-side lens hole and the end-piece-side lens hole, the term "112S" is used in the second embodiment.

Figure 10A:
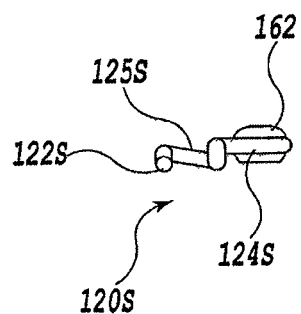
Figure 10B:
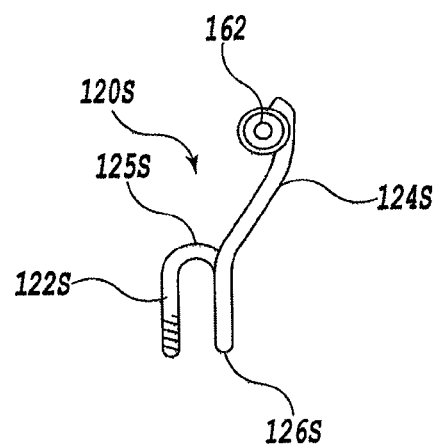
Figure 10C:
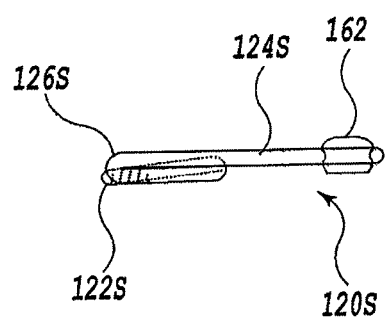

As shown in detail in FIGS. 10A-10C, each of the metallic end-piece members 120S according to the second embodiment has a leg portion 122S serving as a lens fixing portion which is to be fixedly attached in the lens, and an arm portion 124S serving as a connecting portion connected to a temple. Then, in the second embodiment, a first U-shaped curved portion 125S and a second U-shaped curved portion 126S are interposed between the leg portion 122S and the arm portion 124S of the metallic end-piece member 120S. One part of the first U-shaped curved portion 125S is formed in a continuous straight line to the leg portion 122S and the other part serves as one part of the second U-shaped curved portion 126S, while the other part of the second U-shaped curved portion 126S is formed contiguously to the arm portion 124S. In addition, the arm portion 124S is gently curved outward from the portion where it connects to the second U-shaped curved portion 126S. The metallic end-piece member 120S includes the leg portion 122S, the first U-shaped curved portion 125S, the second U-shaped curved portion 126S and the arm portion 124S, which is also formed of one metal wire rod of, for example, a flexible material having easy-bending properties such as a nickel-chromium alloy, a nickel-titanium alloy or the like, in the embodiment. Then, a spiral-shaped groove 128 is formed in the outer peripheral face of the cylindrical leg portion 122S. Regarding the spiral-shaped groove 128, as enlarged and shown in FIG. 4A, as in the case of the first embodiment, a flat face 129 having a greater width B than the width A of the groove is formed on the area between the turns of the spiral-shaped groove 128.

In addition, similarly to the first embodiment, an approximately drum-shaped socket member 162 of a hinge 160 is provided on one end of the arm portion 124S of the metallic end-piece member 120S. The end of the arm portion 124S is then coupled to a temple 170 through the hinge 160. It be should be noted that the temple 170 may be formed integrally without the hinge 160, as described earlier.

It should be noted that, in the second embodiment, the metallic bridge member 130 is the same as that in the first embodiment, and the leg portion 132 of the metallic bridge member 130 is inserted into the bridge-side lens hole 112Sin and fixedly attached to the lens 110S. On the other hand, regarding the metallic end-piece member 120S, the degree of curve of the first U-shaped curved portion 125S and the perforation position of the end-piece-side lens hole 112Uout are determined such that the lens hole 112Uout and the outer edge of the lens 110S are elastically clamped by use of the leg portion 122S and the second U-shaped curved portion 126S which is in contact with the outer edge of the lens 110S.

In the second embodiment, also, the outer peripheral faces of the leg portion 122S of the metallic end-piece member 120S and the leg portion 132 of the metallic bridge member 130 respectively have spiral-shaped grooves 128 and 138 formed therein, and flat faces 129 and 139 formed on the area between the turns of the spiral-shaped groove, which have a greater width B than the width A of the groove. Because of this, the inner peripheral face of the lens hole 112S and the outer peripheral face of each of the leg portions 122S and 132 come into approximately uniform contact with each other, and accordingly a fixed attachment between the lens 110S, the metallic end-piece member 120S and the metallic bridge member 130 is reliably established without producing loosening in the connecting areas between them. In addition, since the contact between the inner peripheral face of the lens hole 112S and the outer peripheral face of each of the leg portions 122S and 132 is achieved on the flat face having a greater width, the facial pressure on the eyeglass lens 110S is reduced, making the occurrence of a fracture difficult.

The method of assembling and disassembling the rimless eyeglasses 100S according the second embodiment is the same as that in the aforementioned first embodiment, and the character "U" attached to the reference numerals should be replaced and read instead as "S".

Now, with respect to the aforementioned first and second embodiments, as enlarged and illustrated in FIG. 4A, the spiral-shaped grooves 128 and 138 respectively formed in the outer peripheral faces of the leg portions 122U, 122S and 132 of the metallic end-piece members 120U and 120S and the metallic bridge member 130, are in the form of a single strip. However, instead of each of these spiral-shaped grooves 128 and 138, a plurality of strips may be formed as long as the flat faces 129 and 139, having a width B greater than the width A of the groove, are maintained.

Also, in the case of forming a plurality of strips, they may be formed by winding the strips in directions different from each other.

Figure 4B:
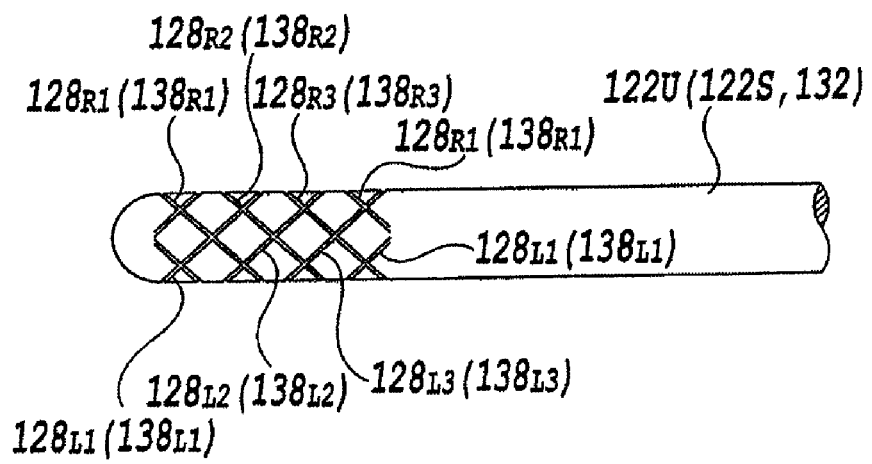

An example of a spiral-shaped groove, which is formed by winding a plurality of strips in different directions from each other is enlarged and shown in FIG. 4B. In the example shown in FIG. 4B, three strips, wound in directions from each other, are formed in a cylindrical leg portion. In this example, a concrete description is given by adding the suffix "R" for strips wound to the right, the suffix "L" for the strips wound to the left and the suffixes "1 to 3", in order, to represent the number of each strip. For example, in the outer peripheral face of the leg portion 122U of the metallic end-piece member 120U, the three spiral-shaped strips 128R1, 128R2 and 128R3 wound to the right and the three spiral-shaped strips 128L1, 128L2 and 128L3 wound to the left are formed in the cylindrical leg portion 122U. For reference, three spiral shaped strips may be formed in the leg portions 122S and 132 of the metallic end-piece member 120S and the metallic bridge member 130 in the same manner.

When forming a plurality of strips wound in directions different from each other as described above, the use of a jig to apply a force that inhibits the cylindrical leg portion from rolling in one direction when the strips are formed will facilitate the forming process.

According to the aforementioned embodiments of the present invention, as is clear from the forgoing, since it is possible to directly insert leg portions of the metallic end-piece member 120S and the metallic bridge member 130 through lens holes of an eyeglass lens made from plastic, a plastic component or the like used for cushioning is unnecessary and a simply designed assembly can be achieved. In addition, since the lens hole is a simply a single circular hole and an adhesive is used, high accuracy is not required in the perforating process, making it possible to readily perform the machining at the retail level.

What is claimed is:

1. Rimless eyeglasses comprising:
   plastic-made eyeglass lenses; and
   a metal-made eyeglass component having a lens fixing portion fixedly attached to the eyeglass lens and a connecting portion connected to either a temple or a bridge, wherein the lens fixing portion of the eyeglass component has a single cylindrical leg portion inserted into a lens hole formed in the eyeglass lens to be perforated therethrough and a spiral-shaped groove is formed in the outer peripheral face of the leg portion,
   a flat face having a width greater than the width of the groove is formed on the area between the turns of the spiral-shaped groove,
   when the cylindrical leg portion of the lens fixing portion is inserted into the lens hole, either the head end or the tail end of the spiral-shaped groove is exposed on the surface of the eyeglass lens, and an adhesive is injected into the spiral-shaped groove from the exposed head or tail end of the spiral-shaped groove, whereby the lens fixing portion is adhesively bonded to the eyeglass lens.

2. The rimless eyeglasses according to claim 1, wherein the spiral-shaped groove comprises a single strip.

3. The rimless eyeglasses according to claim 1, wherein the spiral-shaped groove comprises a plurality of strips.

4. The rimless eyeglasses according to claim 3, wherein the plurality of strips are wound in different directions.

5. The rimless eyeglasses according to claim 1, wherein the eyeglass component is an end-piece of which the connecting portion is connected to the temple through a hinge.

6. The rimless eyeglasses according to claim 1, wherein the eyeglass component is a bridge including the lens fixing portion and the connecting portion and formed of a single wire rod.

* * * * *